Patented May 19, 1931

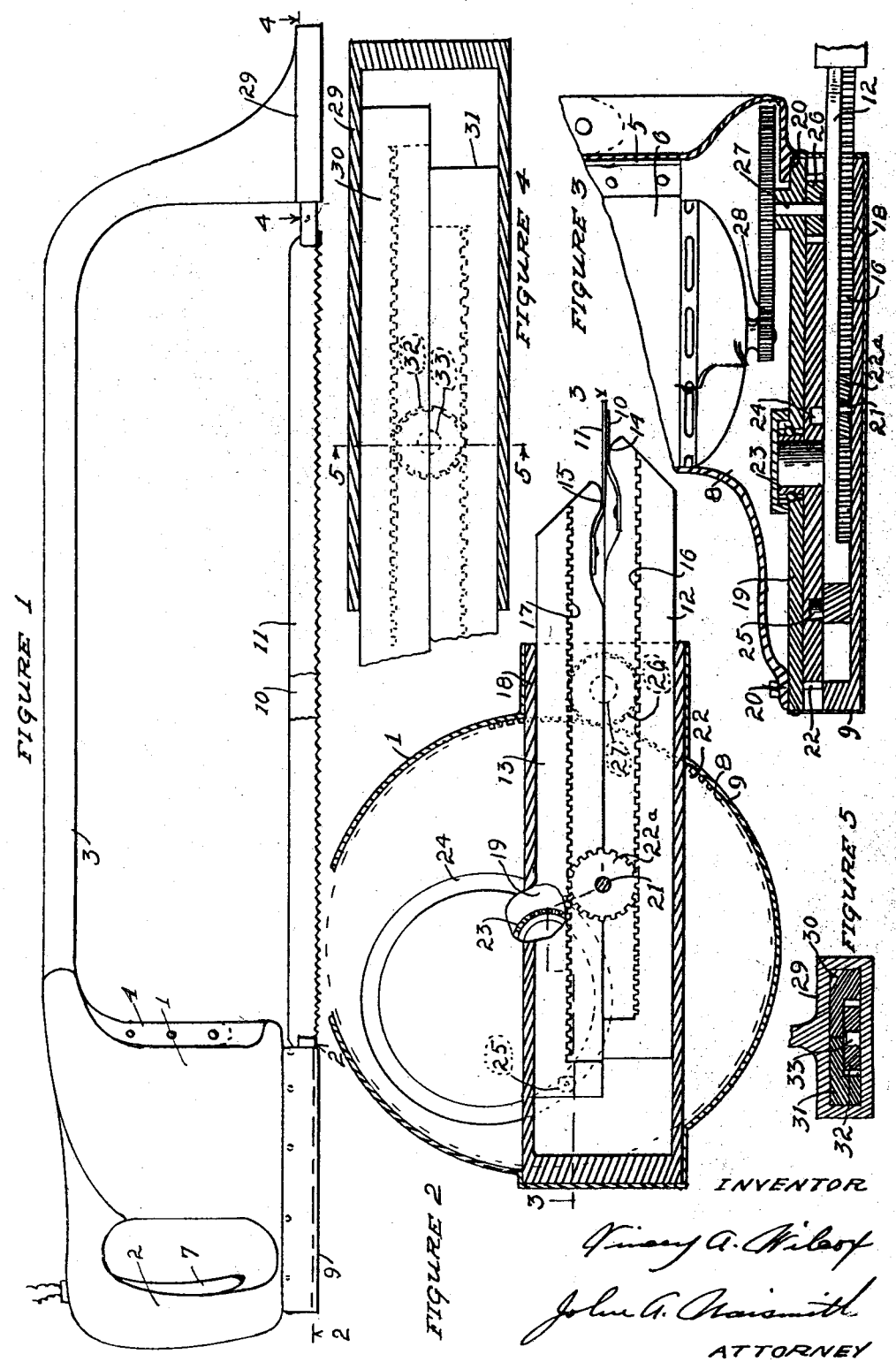

1,805,936

UNITED STATES PATENT OFFICE

VINCEY A. WILCOX, OF LOS GATOS, CALIFORNIA, ASSIGNOR OF ONE-HALF TO CLAUDE C. PARKS, OF SAN JOSE, CALIFORNIA

SAW

Application filed April 30, 1930. Serial No. 448,712.

This invention relates particularly to a power operated saw particularly designed for cutting bones in a slaughter house or butcher shop.

It is the object of the invention to provide an electrically operated saw of the character indicated so constructed and arranged that the cutting operation may be accomplished without manual effort upon the part of the operator, and smoothly and rapidly.

It is another object of the invention to provide a saw of the character indicated that will be economical to manufacture, simple and strong in construction, of few parts, positive in operation, and highly efficient in its practical application.

In the drawings:

Figure 1 is a side elevation of a saw embodying my invention.

Figure 2 is an enlarged section on line 2—2 of Figure 1.

Figure 3 is a section on line 3—3 of Figure 2.

Figure 4 is an enlarged section on line 4—4 of Figure 1.

Figure 5 is a section on line 5—5 of Figure 4.

In the embodiment of the invention as herein disclosed, I show at 1 a housing provided with a handle as 2 and having a back or bow 3 mounted thereon as at 4.

The housing 1 has an upper chamber 5 in which is mounted an electric motor 6 controlled by a switch 7 in handle 2, and a lower chamber 8 in which is mounted the saw blade operating means, the bottom of chamber 8 being closed by a cap or closure 9 as shown.

The essential feature of the invention is to provide a pair of saw blades as 10 and 11 arranged side by side as shown in Figure 2, and then provide a means for reciprocating the blades at equal speeds in opposite directions.

In the present case the blades 10—11 are connected at their corresponding ends to bars as 12—13, these bars being formed as at 14—15 whereby to hold the blades flat against each other as shown.

The bars 12—13 are provided with opposed racks as 16—17 and are slidably mounted in a guide 18 mounted upon a plate 19 which is in turn rigidly mounted in the housing 1 as at 20. The guide 18 carries a pin at 21 upon which is revolubly mounted a pinion 22a meshing with the racks 16—17 whereby a reciprocating movement imparted to either rack will impart a similar movement to the other rack, but in the opposite direction.

At 22 is shown a gear inserted between racks 16—17 and plate 19 and journaled in plate 19 as at 23. On the bottom of this gear is formed a cam groove 24 in which travels a pin 25 mounted on rack 17, the center of the groove being eccentrically disposed relative to the center of the gear 22.

The gear 22 is driven by means of a pinion 26 journaled on plate 19 at 27 and driven by the motor 6 through the medium of gears 28.

On the outer end of the back 3 is formed a guide 29 in which are mounted a pair of racks 30—31 cooperating through the medium of a pinion 32 on a pin 33 and connected to the blades 10—11 in the same manner as the first mentioned racks.

By means of the construction above set forth, when the handle 2 is grasped and the switch 7 closed the motor 6 is put into operation and the gear 22 caused to rotate as above set forth. The rotation of gear 22 imparts a reciprocating movement to rack 17 through the medium of the eccentrically disposed groove 24 and pin 25, and the reciprocation of rack 17 imparts a similar movement to rack 16 through the medium of pinion 22a.

Since the two blades 10 and 11 are held close together and reciprocated rapidly in opposite directions a large bone can be cut through quickly and smoothly.

It is to be understood, of course, that while I have herein shown and described but one specific embodiment of the invention, changes in form, construction, and method of assembly and operation may be made within the scope of the appended claim.

I claim:

A device of the character described comprising, a supporting frame, spaced and aligned guides disposed thereon, a pair of opposed racks slidably mounted in each guide, a pinion journaled in each guide to mesh with the racks therein, saw blades mounted on the racks and disposed side by side whereby to make a single cut, a gear journaled in the frame and having an annular groove formed therein eccentrically disclosed relative to its axis of rotation, a pin mounted on one rack to engage said groove, and driving means for the gear mounted in the frame.

VINCEY A. WILCOX.